(12) United States Patent
Lee et al.

(10) Patent No.: US 10,993,250 B2
(45) Date of Patent: *Apr. 27, 2021

(54) APPARATUS AND METHOD FOR TRANSMITTING DATA IN WIRELESS COMMUNICATION SYSTEM

(71) Applicant: LG Electronics Inc., Seoul (KR)

(72) Inventors: Sunyoung Lee, Seoul (KR); Seungjune Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/801,872

(22) Filed: Feb. 26, 2020

(65) Prior Publication Data

US 2020/0196334 A1    Jun. 18, 2020

Related U.S. Application Data

(63) Continuation of application No. 16/065,612, filed as application No. PCT/KR2017/004535 on Apr. 28, 2017, now Pat. No. 10,595,329.

(Continued)

(51) Int. Cl.
*H04W 72/12* (2009.01)
*H04W 72/04* (2009.01)
*H04W 72/14* (2009.01)

(52) U.S. Cl.
CPC ... *H04W 72/1268* (2013.01); *H04W 72/0446* (2013.01); *H04W 72/1284* (2013.01);

(Continued)

(58) Field of Classification Search
CPC ......... H04W 72/1284; H04W 72/0446; H04W 72/14
See application file for complete search history.

(56) References Cited

U.S. PATENT DOCUMENTS

| | | | |
|---|---|---|---|
| 2008/0080465 | A1 | 4/2008 | Pajukoski et al. |
| 2013/0287012 | A1 | 10/2013 | Pragada et al. |

(Continued)

FOREIGN PATENT DOCUMENTS

| | | |
|---|---|---|
| CN | 104468030 | 3/2015 |
| JP | 2014511080 | 5/2014 |

(Continued)

OTHER PUBLICATIONS

Huawei et al., "Short TTI for UL transmissions," 3GPP TSG RAN WG1 Meeting #84bis, dated Apr. 11-15, 2016, 4 pages.

(Continued)

*Primary Examiner* — Afshawn M Towfighi
(74) *Attorney, Agent, or Firm* — Fish & Richardson P.C.

(57) ABSTRACT

The present invention relates to a wireless communication system. More specifically, the present invention relates to a method and a device for transmitting, by a user equipment (UE), data in a wireless communication system, the method comprising: receiving an uplink grant including first transmission time interval (TTI) duration information; transmitting a Medium Access Control Protocol Data Unit (MAC PDU) using the uplink grant, wherein the MAC PDU includes data associated with at least one radio bearer supporting a TTI duration indicated by the first TTI duration information.

18 Claims, 9 Drawing Sheets

Related U.S. Application Data

(60) Provisional application No. 62/330,864, filed on May 3, 2016, provisional application No. 62/330,201, filed on May 1, 2016.

(52) U.S. Cl.
CPC ....... *H04W 72/1289* (2013.01); *H04W 72/14* (2013.01); *H04W 72/042* (2013.01)

(56) References Cited

U.S. PATENT DOCUMENTS

| | | |
|---|---|---|
| 2015/0071237 A1 | 3/2015 | Yi et al. |
| 2015/0085674 A1 | 3/2015 | Wu |
| 2015/0201426 A1 | 7/2015 | Yi et al. |
| 2016/0037510 A1* | 2/2016 | Park .................. H04W 56/0005 370/329 |
| 2016/0095137 A1 | 3/2016 | Chen et al. |
| 2017/0142704 A1 | 5/2017 | Jung et al. |
| 2017/0164363 A1* | 6/2017 | Zhang .................. H04L 5/0055 |
| 2017/0318603 A1 | 11/2017 | Yi et al. |

FOREIGN PATENT DOCUMENTS

| | | |
|---|---|---|
| KR | 1020140031986 | 3/2014 |
| KR | 1020150084901 | 7/2015 |
| KR | 1020150085841 | 7/2015 |
| KR | 1020160036663 | 4/2016 |
| WO | WO2014163288 | 10/2014 |
| WO | WO2016029736 | 3/2016 |

OTHER PUBLICATIONS

Intel Corporation, "UL design aspects of TTI shortening," 3GPP TSG-RAN WG1 #84bis, dated Apr. 11-15, 2016, 3 pages.
International Search Report in International Application No. PCT/KR2017/004535, dated Jul. 24, 2017, 17 pages.
United States Notice of Allowance in U.S. Appl. No. 15/583,641, dated May 10, 2019, 10 pages.
United States Office Action in U.S. Appl. No. 15/583,641, dated Jun. 28, 2018, 14 pages.
US Final Office Action in U.S Appl. No. 15/583,641, dated Feb. 7, 2019, 16 pages.

* cited by examiner

FIG. 3
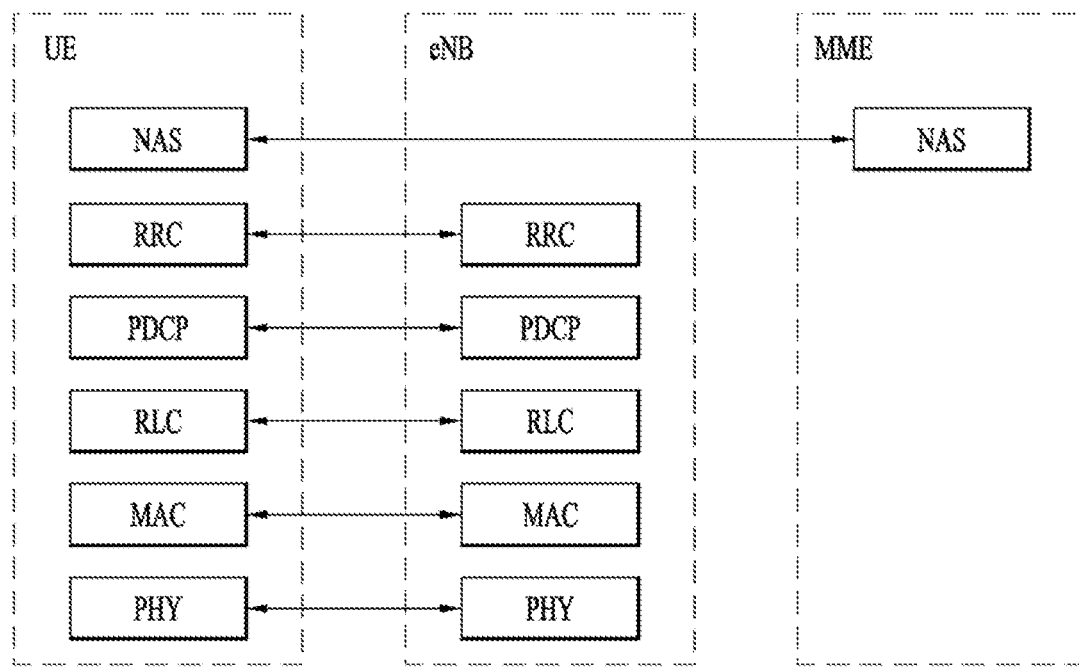
(a) Control-Plane Protocol Stack
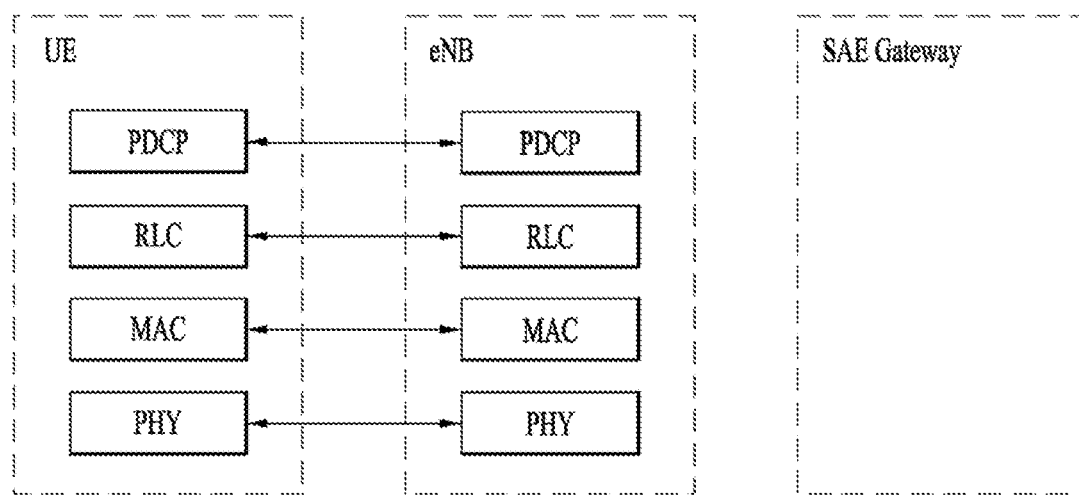
(b) User-Plane Protocol Stack

APPARATUS AND METHOD FOR TRANSMITTING DATA IN WIRELESS COMMUNICATION SYSTEM

CROSS-REFERENCE TO RELATED APPLICATIONS

This application is a continuation of U.S. application Ser. No. 16/065,612, filed on Jun. 22, 2018, now allowed, which is a National Stage application under 35 U.S.C. § 371 of International Application No. PCT/KR2017/004535, filed Apr. 28, 2017, which claims the benefit of U.S. Provisional Application No. 62/330,864, filed on May 3, 2016, and U.S. Provisional Application No. 62/330,201, filed May 1, 2016. The disclosures of the prior applications are incorporated by reference in their entirety.

TECHNICAL FIELD

The present invention relates to a wireless communication system and, more particularly, to a method for transmitting data.

BACKGROUND

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARD)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

SUMMARY

Based on the above-mentioned discussion, methods for transmitting data in a wireless communication system and apparatuses therefor shall be proposed in the following description.

Technical tasks obtainable from the present invention are non-limited by the above-mentioned technical task. And, other unmentioned technical tasks can be clearly understood from the following description by those having ordinary skill in the technical field to which the present invention pertains.

To achieve these and other advantages and in accordance with the purpose of the present invention, as embodied and broadly described, a method for transmitting, by a user equipment (UE), data in a wireless communication system, the method comprising: receiving an uplink grant including first transmission time interval (TTI) duration information; transmitting a Medium Access Control Protocol Data Unit (MAC PDU) using the uplink grant, wherein the MAC PDU includes data associated with at least one radio bearer supporting a TTI duration indicated by the first TTI duration information.

In accordance with another aspect of the present invention, A User Equipment (UE) for operating in a wireless communication system, the UE comprising: a radio frequency (RF) module configured to transmit/receive signals to/from a network; and a processor configured to process the signals, wherein the processor is configured to: receive an uplink grant including first transmission time interval (TTI) duration information, transmit a Medium Access Control Protocol Data Unit (MAC PDU) using the uplink grant, and wherein the MAC PDU includes data associated with at least one radio bearer supporting a TTI duration indicated by the first TTI duration information.

The method further comprising receiving second TTI duration information for configureing multiple radio bearers, wherein the second TTI duration information includes one or more TTI durations per radio bearer Preferably, the at least one radio bearer corresponds to a radio bearer other than a radio bearer not supporting a TTI duration indicated by the first TTI duration information.

Preferably, the MAC PDU including the data associated with the radio bearer is transmitted based on a TTI duration indicated by the first TTI duration information.

The method further comprising discarding the uplink grant if there is no radio bearer supporting the TTI duration indicated by the first TTI duration information.

The method further comprising discarding the uplink grant if there is no radio bearer supporting the TTI duration indicated by the first TTI duration information and if there is no triggered MAC CE.

In accordance with another aspect of the present invention, A base station (BS) for operating in a wireless communication system, the BS comprising: a radio frequency (RF) module configured to transmit/receive signals to/from a network; and a processor configured to process the signals, wherein the processor is configured to: transmit an uplink grant including first transmission time interval (TTI) duration information, receive a Medium Access Control Protocol Data Unit (MAC PDU) transmitted using the uplink grant, and wherein the MAC PDU includes data associated with at least one radio bearer supporting a TTI duration indicated by the first TTI duration information.

It is to be understood that both the foregoing general description and the following detailed description of the present invention are exemplary and explanatory and are intended to provide further explanation of the invention as claimed.

According to the present invention, the UE can transmit data associated with a radio bearer supporting a specific TTI duration.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 3 is a diagram showing a control plane and a user plane of a radio interface protocol between a UE and an E-UTRAN based on a 3rd generation partnership project (3GPP) radio access network standard;

DETAILED DESCRIPTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
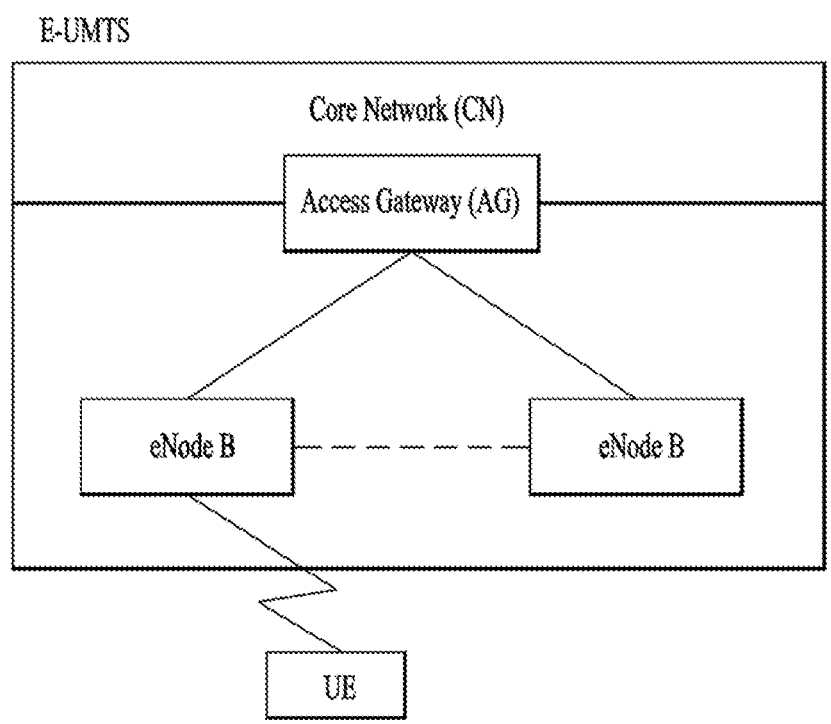
FIG. 1 is a diagram showing a network structure of an Evolved Universal Mobile Telecommunications System (E-UMTS) as an example of a wireless communication system.
Figure 2A:
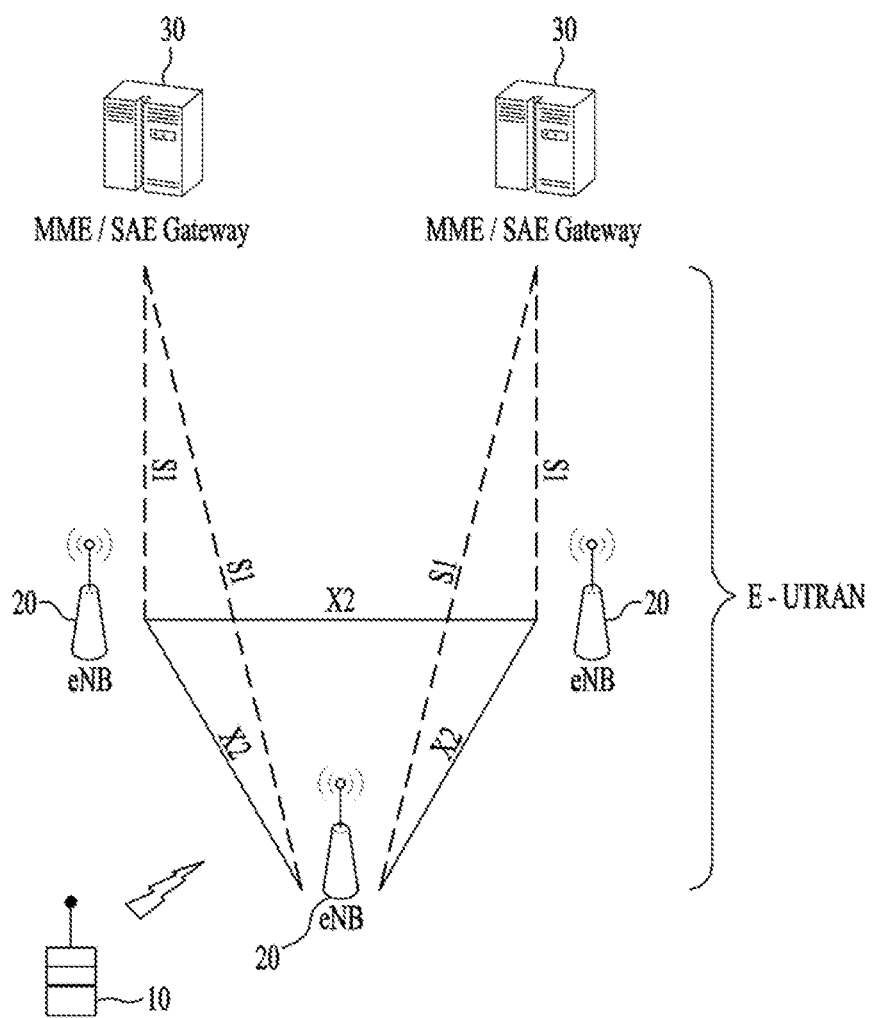
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
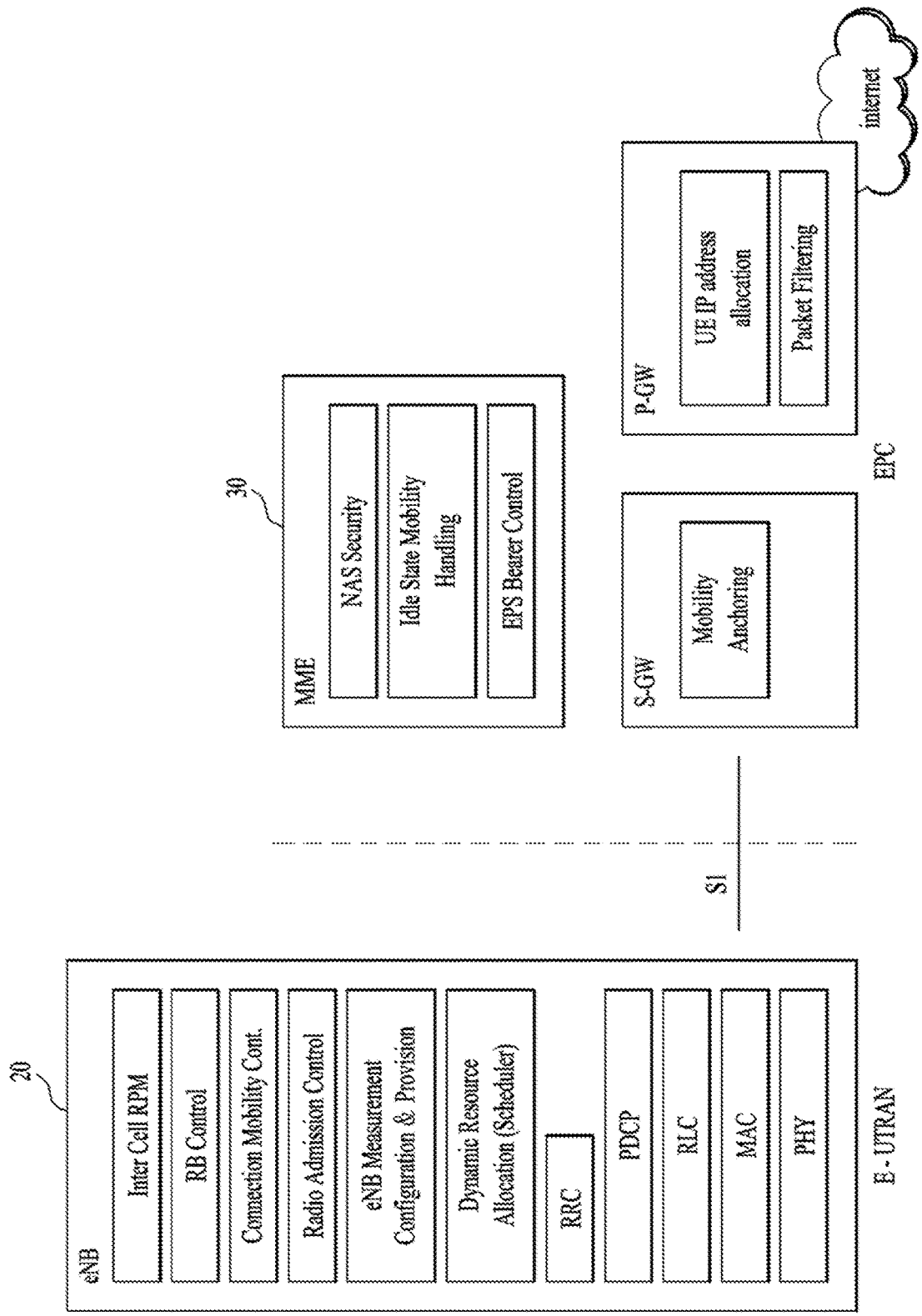
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
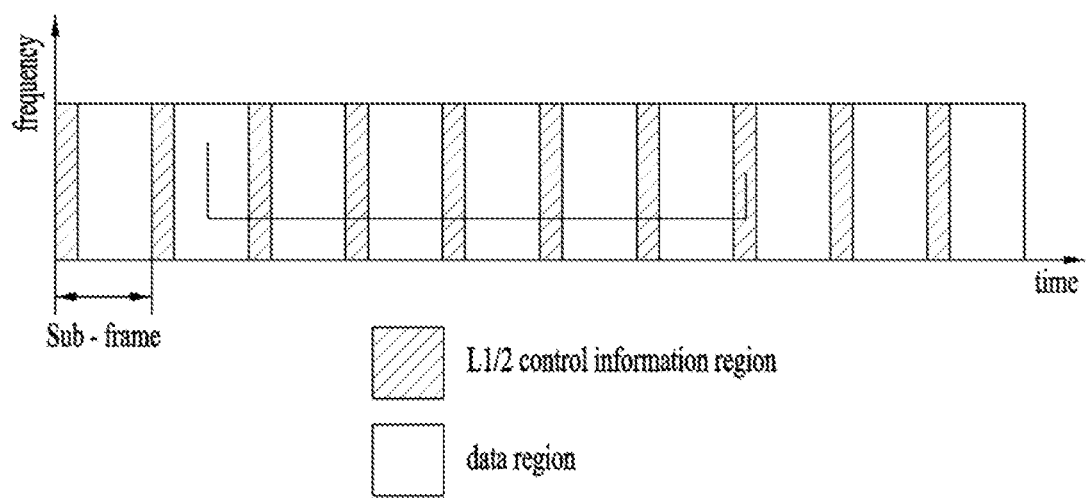
FIG. 4 is a view showing an example of a physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
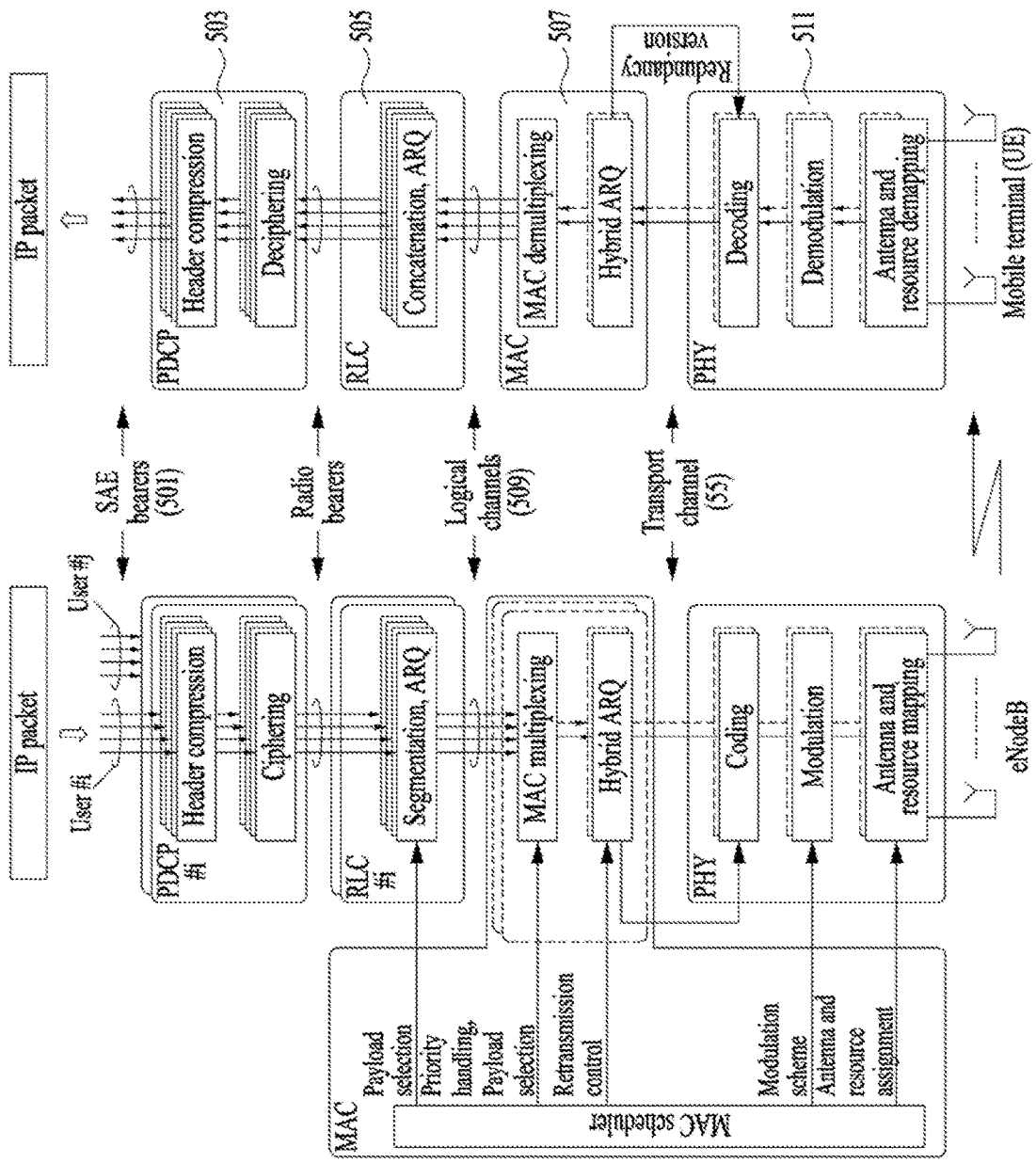
FIG. 5 is a diagram for a general overview of the LTE protocol architecture for the downlink.

FIG. 5 is a diagram for a general overview of the LTE protocol architecture for the downlink.

A general overview of the LTE protocol architecture for the downlink is illustrated in FIG. 5. Furthermore, the LTE protocol structure related to uplink transmissions is similar to the downlink structure in FIG. 5, although there are differences with respect to transport format selection and multi-antenna transmission.

Data to be transmitted in the downlink enters in the form of IP packets on one of the SAE bearers (501). Prior to transmission over the radio interface, incoming IP packets are passed through multiple protocol entities, summarized below and described in more detail in the following sections:

Packet Data Convergence Protocol (PDCP, 503) performs IP header compression to reduce the number of bits necessary to transmit over the radio interface. The header-compression mechanism is based on ROHC, a standardized header-compression algorithm used in WCDMA as well as several other mobile-communication standards. PDCP (503) is also responsible for ciphering and integrity protection of the transmitted data. At the receiver side, the PDCP protocol performs the corresponding deciphering and decompression operations. There is one PDCP entity per radio bearer configured for a mobile terminal.

Radio Link Control (RLC, 505) is responsible for segmentation/concatenation, retransmission handling, and in-sequence delivery to higher layers. Unlike WCDMA, the RLC protocol is located in the eNodeB since there is only a single type of node in the LTE radio-access-network architecture. The RLC (505) offers services to the PDCP (503) in the form of radio bearers. There is one RLC entity per radio bearer configured for a terminal.

There is one RLC entity per logical channel configured for a terminal, where each RLC entity is responsible for: i) segmentation, concatenation, and reassembly of RLC SDUs; ii) RLC retransmission; and iii) in-sequence delivery and duplicate detection for the corresponding logical channel.

Other noteworthy features of the RLC are: (1) the handling of varying PDU sizes; and (2) the possibility for close interaction between the hybrid-ARQ and RLC protocols. Finally, the fact that there is one RLC entity per logical channel and one hybrid-ARQ entity per component carrier implies that one RLC entity may interact with multiple hybrid-ARQ entities in the case of carrier aggregation.

The purpose of the segmentation and concatenation mechanism is to generate RLC PDUs of appropriate size from the incoming RLC SDUs. One possibility would be to define a fixed PDU size, a size that would result in a compromise. If the size were too large, it would not be possible to support the lowest data rates. Also, excessive padding would be required in some scenarios. A single small PDU size, however, would result in a high overhead from the header included with each PDU. To avoid these drawbacks, which is especially important given the very large dynamic range of data rates supported by LTE, the RLC PDU size varies dynamically.

In process of segmentation and concatenation of RLC SDUs into RLC PDUs, a header includes, among other fields, a sequence number, which is used by the reordering and retransmission mechanisms. The reassembly function at the receiver side performs the reverse operation to reassemble the SDUs from the received PDUs.

Medium Access Control (MAC, 507) handles hybrid-ARQ retransmissions and uplink and downlink scheduling. The scheduling functionality is located in the eNodeB, which has one MAC entity per cell, for both uplink and downlink. The hybrid-ARQ protocol part is present in both the transmitting and receiving end of the MAC protocol. The MAC (507) offers services to the RLC (505) in the form of logical channels (509).

Physical Layer (PHY, 511), handles coding/decoding, modulation/demodulation, multi-antenna mapping, and other typical physical layer functions. The physical layer (511) offers services to the MAC layer (507) in the form of transport channels (513).

In LTE, one subframes has a fixed time duration of transmission, i.e., 1 ms. Accordingly, Transmission Time Interval (TTI) is set to only 1 ms, and Layer 2 operates based on TTI. For supporting various use cases optimally in 5G New RAT (NR), flexible transmission duration was proposed. The main idea here is to Layer 2 operates based on various TTI, for instance, short TTI is used where a very short latency is required while long TTI is used where elsewhere.

One purpose of supporting a shorter TTI duration is to enable transmission of data within 1 ms, which has been used as a TTI in LTE. This implies that data of a radio bearer which has a strong requirement in terms of latency needs to be transmitted by using both of shorter TTI duration and longer TTI duration. On the other hand, data of a radio bearer which is delay tolerant may not need to be transmitted by using shorter TTI duration, which would have a cost of increased overhead. Therefore, it requires a mechanism that handles multiple radio bearers with flexible and/or different TTIDs in order to support different latency requirement for each radio bearer.

In this invention, a UE may receive a TTI information of a radio bearer from an eNB, which is used as a basic unit of layer 2 operation of the radio bearer. When the eNB configures the radio bearer for the UE, the eNB may send the TTI information to the UE.

For example, the TTI information indicates the transmission time interval (TTI) for the radio bearer by including transmission time interval duration (TTID). In the present invention, the TTID may be referred to as transmission time interval value (TTIV) or radio bearer transmission time interval duration (RB_TTID). The first TTI information and the second TTI information may include different time values. In addition, each of the TTI information may include one or more TTID.

As an example, the TTID may be a specific time value, such as 1 ms, 0.5 ms, or 0.1 ms. Alternatively, the TTID may be a TTI class configured by the eNB. The TTI class may be pre-defined between the UE and the eNB, or specified in the specification. Each TTI class is mapped to a certain transmission time interval, for instance, TTI class 1 is mapped to 1 ms, TTI class 2 is mapped to 0.5 ms, and TTI class 3 is mapped to 0.1 ms.

For another example, the TTI information does not include the TTID. If there is no TTID in the TTI information, or the UE doesn't receive the TTI information, the UE sets TTI for all radio bearers to a default value of TTID. The default value of TTID is configured by the eNB, pre-defined between the UE and the eNB, or specified in the specification.

The TTI information may be defined per radio bearer, per group of radio bearers, or per UE. For this, the TTI information may include RB information indicating to which the TTID is applied. The RB information may be identification of at least one radio bearer, or identification of at least one group of radio bearers. If there is no identification of the radio bearer or the group of radio bearers in the TTI information, the UE set TTI for all radio bearers configured for the UE to the TTID.

When the UE receives the TTI information from the eNB including TTID and/or the RB information, the UE may apply TTID to the radio bearers indicated by the RB information. For example, if the UE receives the TTI information [RB #1—TTID1, RB #2—TTID2], the UE applies TTID1 to RB #1 and TTID2 to RB #2. If the UE receives the TTI information [RB Group #1—none, RB Group #2—TTID1], the UE applies default TTI value to all radio bearers belonging to RB Group #1, and applies TTID1 to all radio bearers belonging to RB Group #2.

In order to use the TTID configured for the radio bearer, the UE may have one separate Layer 2 entity associated with the radio bearer where the Layer 2 operates based on the TTID configured for the radio bearer. Alternatively, the UE may have one separate Layer 2 entity associated with the radio bearers of which TTIs are the same TTID. In other words, the UE may have different Layer 2 entities for the radio bearers of which TTIs are different TTID. Layer 2 entity is for example, MAC entity, RLC entity, and/or PDCP entity.

If the UE is configured with a plurality of radio bearers and each radio bearer is configured with one or more TTIDs, the eNB need to inform the UE of a specific TTID for performing uplink transmission using uplink grant.

Figure 6:
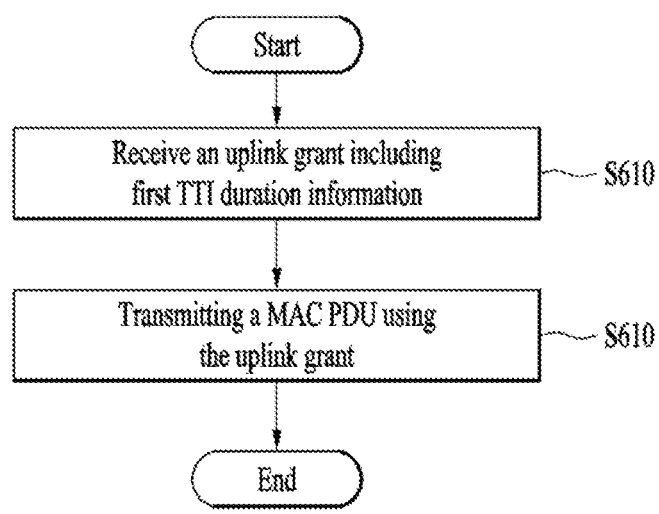
FIG. 6 is a diagram illustrating data transmission using TTI duration information according to an embodiment of the present invention.

FIG. 6 is a diagram illustrating data transmission using TTI duration information according to an embodiment of the present invention.

Referring to FIG. 6, the UE may receive an uplink grant including first transmission time interval (TTI) duration information (S610). When the eNB provides an uplink grant to the UE, the eNB may provide TTID information of the uplink grant, where the TTID information indicates the TTID associated with the uplink grant.

As an example, the eNB may provide the TTID information explicitly together with the uplink grant, i.e., the UE receives the TTID information explicitly from the eNB together with the uplink grant. For example, the eNB may provide the uplink grant to the UE including the TTID information associated with the uplink grant, e.g., UL grant with TTID=1 ms or UL grant with TTID=0.1 ms.

As another example, the eNB may provide the TTID information implicitly, i.e., the UE may identify the TTID information based on the radio resource indicated by the uplink grant. For example, when the UE receives the uplink grant for a cell, the UE considers that the uplink grant is associated with the TTID which is supported by the cell. For this, the eNB may provide the TTID supported by the cell to the UE via a Layer 2 signaling, e.g., RRC/PDCP/RLC/MAC signaling.

When the UE receives the uplink grant with the TTID information, the UE may check the TTID information and selects the radio bearers of which data is to be transmitted by using the received uplink grant.

As an example, after the UE selects at least one radio bearers supporting the TTID indicated by the TTID information, the UE may generate a Medium Access Control (MAC) Protocol Data Unit (PDU) by including the data of the selected radio bearers. As a specific example, the UE may generate a MAC PDU containing only data of the selected radio bearers. In the present invention, the MAC PDU may be referred to as a PDU or layer 2 PDU. When the UE generates the MAC PDU by including the data of the selected radio bearers, the UE may perform layer 2 operation of the selected radio bearer based on the TTID associated with the UL grant.

Subsequently, the UE may transmit the MAC PDU using the uplink grant based on a TTID indicated by the TTID information (S620). A detailed description thereof will be described later.

On the other hand, if there is no radio bearer supporting the TTID indicated by the TTID information, the UE may discard the uplink grant. Alternatively, if there is no radio bearer supporting the TTID indicated by the first TTID information and if there is no triggered MAC Control Element (MAC CE), the UE may discard the uplink grant.

Figure 7:
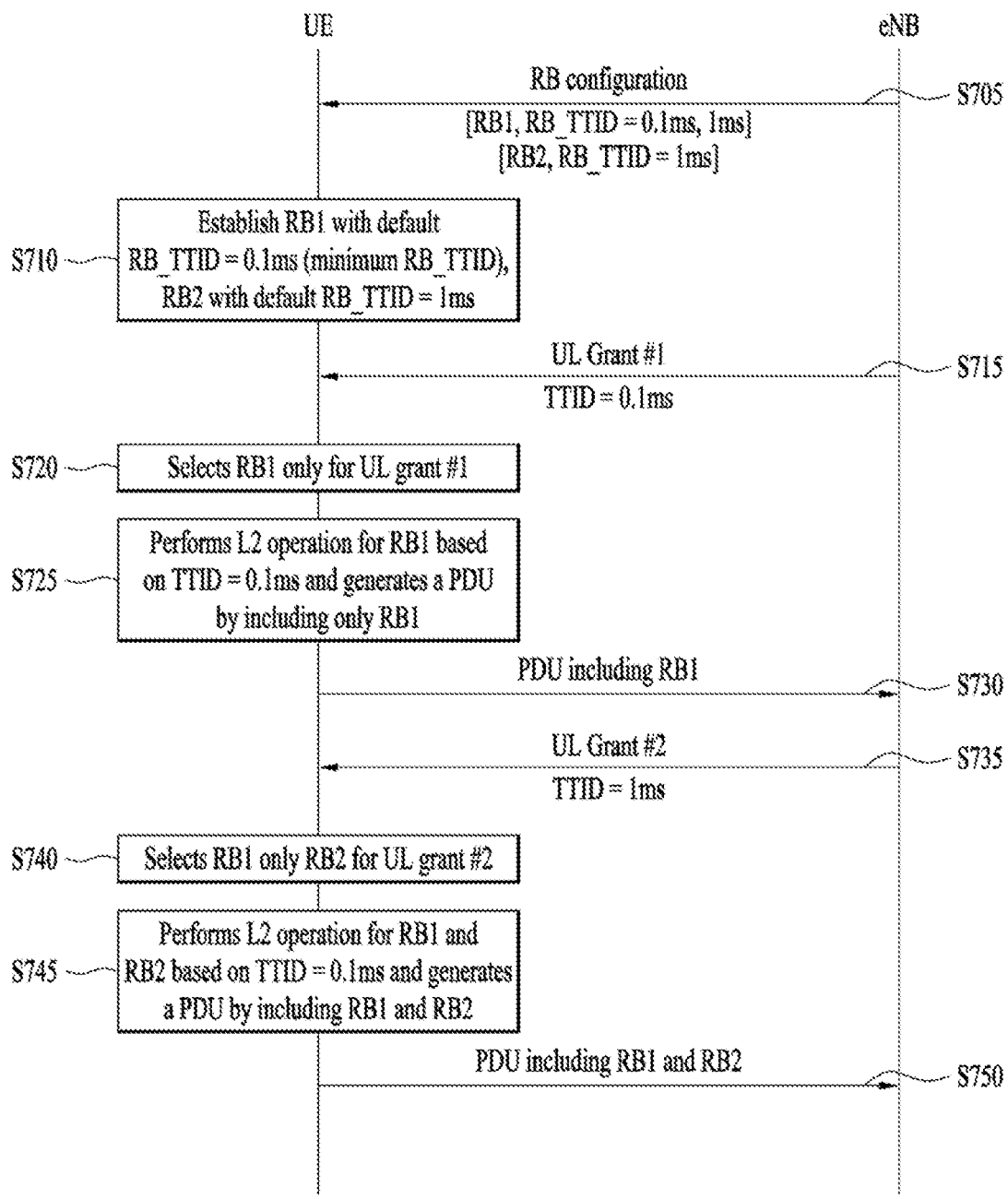
FIG. 7 is an exemplary diagram for explaining a specific operation according to an embodiment of the present invention.

FIG. 7 is an exemplary diagram for explaining a specific operation according to an embodiment of the present invention.

Referring to FIG. 7, The UE may receive an RB configuration including TTID of the radio bearer (S705). When an eNB configures radio bearers for a UE, the eNB may send at least one TTID associated with the radio bearers. Through this, the UE may be configured with at least two radio bearers and each of the at least two radio bearers may be configured with one or more TTI durations (TTIDs). If the eNB configures at least two radio bearers for the UE, the TTID associated with each of the at least two radio bearers can be different. For example, the TTID of RB #1 are 0.1 ms and 1 ms while TTID of RB #2 is 1 ms.

When the UE receives a configuration of a radio bearer with at least one TTID associated with the radio bearer, the UE may configure the RB #1 and RB #2 based on the received at least one TTID associated with the radio bearer (S710). In addition, The UE may consider that the layer 2 operation of the radio bearer can be based on one of the TTIDs associated with the radio bearer. For this, the UE may select one TTID and uses the selected TTID as a basic unit of layer 2 operation of the at least two radio bearers. At this, layer 2 operation may be at least one of generation of a MAC PDU (multiplexing and assembly), HARQ operation, processing of uplink grant, and/or data transfer.

For example, among the at least one TTIDs associated with the radio bearer, the UE may select one TTID as a default TTID of the radio bearer. As an example, the default TTID of the radio bearer may be a i) Minimum TTID among the TTIDs of the radio bearer, ii) Maximum TTID among the TTIDs of the radio bearer, or iii) One specific TTID indicated by the eNB.

For example, the default TTID of the radio bearer may be a Minimum TTID among the TTIDs of the radio bearer. In this case, for RB #1, among two TTID, the minimum value 0.1 ms may be the default TTID of the RB #1. Also, for RB #2, the only one TTID, i.e., 1 ms, is the default TTID of the RB #2. As a default TTID, the UE considers that the layer 2 operation of RB #1 is based on e.g., the minimum TTID=0.1 ms while the layer 2 operation of RB #2 is based on 1 ms. As another example, the UE may consider that the layer 2 operation of RB #1 can also be performed based on 1 ms depending on e.g., eNB scheduling or uplink grant, while the default TTID for layer 2 operation of RB #1 is 0.1 ms.

Subsequently, the UE may receive an UL grant #1 and a TTID associated with the UL grant #1 (S715). For example, the TTID associated with the UL grant #1 may be 0.1 ms. When the UE receive the UL grant #1, the UE may select at least one radio bearers supporting the TTID associated with the UL grant #1 (S720). As an example, the UE may select the radio bearers of which default TTID is the same as TTID associated with the UL grant. In other word, the UE may select a radio bearer configured with a same TTID as the TTID associated with the UL grant #1. In this case, the UE may select RB #1 and does not select RB #2. On the other hand, if the UE receives UL grant with TTID=1 ms, the UE selects RB #2 and does not select RB #1.

As another example, the UE may select the radio bearers of which any of the TTID is the same as TTID associated with the UL grant. In this case, if the UE receives UL grant with TTID=0.1 ms, the UE may select RB #1 and does not select RB #2. On the other hand, if the UE receives UL grant with TTID=1 ms, the UE may select both of RB #1 and RB #2.

In this example, assuming the UE is configured to select the radio bearers of which default TTID is the same as TTID associated with the UL grant, the UE may select RB #1 of which data is to be transmitted by using the UL grant #1 according to the received TTID associated with the UL grant #1.

After then, the UE may perform the layer 2 operation based on 0.1 ms of TTI (S725). For instance, the layer 2 operation may be MAC PDU generation, and/or HARQ operation. And, the UE may generate the MAC PDU by including the data of only RB #1. After generating the MAC PDU, the UE transmits the generated MAC PDU based on TTI=0.1 ms (S730).

Thereafter, the UE may receive an UL grant #2 and a TTID associated with the UL grant #2. At this time, the TTID associated with the UL grant #2 may be 1 ms (S735). In this case, according to the received TTID associated with the UL grant #2, the UE may select RB #1 and RB #2 of which data are to be transmitted by using the UL grant #2 (S740).

After then, the UE may perform the layer 2 operation based on 1 ms of TTI (S745). For instance, the layer 2 operation may be MAC PDU generation, and/or HARQ operation. And, the UE may generate the MAC PDU by including the data of RB #1 and RB #2. After generating the MAC PDU, the UE transmits the generated MAC PDU based on TTI=1 ms (S750).

Figure 8:
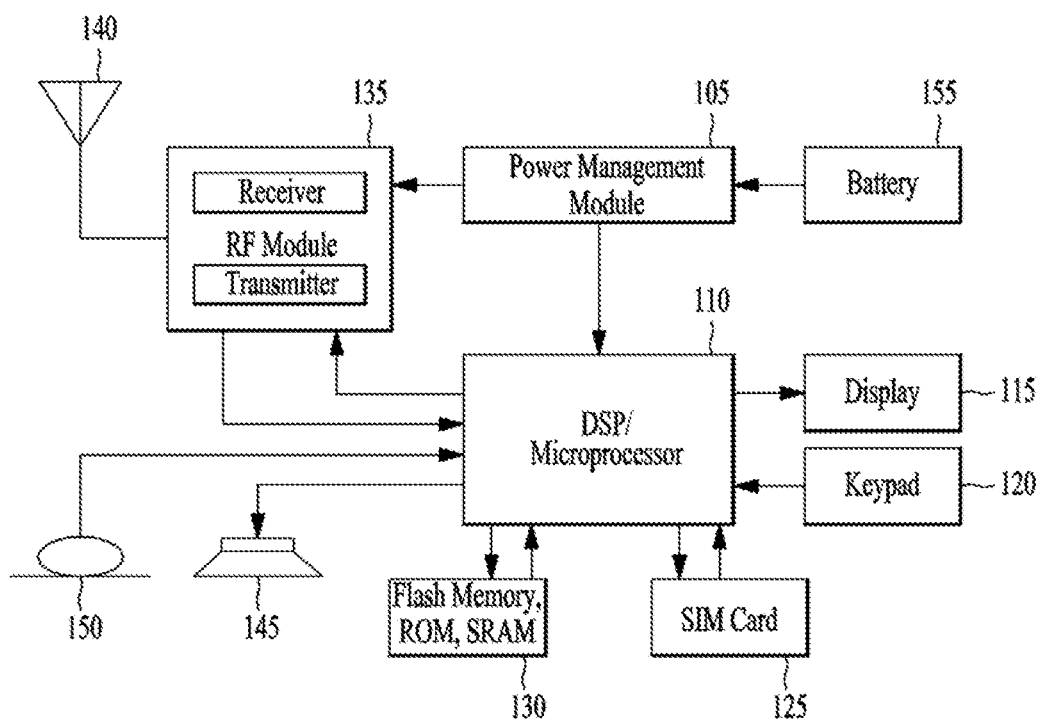
FIG. 8 is a block diagram of a communication apparatus according to an embodiment of the present invention.

FIG. 8 is a block diagram of a communication apparatus according to an embodiment of the present invention.

The apparatus shown in FIG. 8 can be a user equipment (UE) and/or eNB adapted to perform the above mechanism, but it can be any apparatus for performing the same operation.

As shown in FIG. 8, the apparatus may comprise a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 8 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 8 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. The processor (110) is configured to perform operations according to the embodiment of the present invention exemplarily described with reference to the accompanying drawings. In particular, the detailed operations of the processor (110) can refer to the contents described with reference to FIGS. 1 to 7.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

While the above-described method has been described centering on an example applied to the 3GPP LTE system, the present invention is applicable to a variety of wireless communication systems in addition to the 3GPP LTE system.

What is claimed is:

1. A method for transmitting, by a user equipment (UE), a protocol data unit (PDU) in a wireless communication system, the method comprising:
receiving a plurality of transmission duration configurations, wherein each transmission duration configuration relates to a maximum allowed transmission duration on a corresponding radio bearer among a plurality of radio bearers that are configured for the UE;
receiving an uplink grant to perform an uplink transmission with a first transmission duration;
generating the PDU to include data for at least one radio bearer among the plurality of radio bearers; and
transmitting the PDU based on the uplink grant,
wherein the data that is included in the PDU is determined based on at least a condition that:
for each radio bearer among the at least one radio bearer for which data is included in the PDU, the first transmission duration satisfies a comparison criterion with the maximum allowed transmission duration for the each radio bearer.

2. The method of claim 1, wherein the plurality of transmission duration configurations includes at least one transmission duration configuration that provides a plurality of allowed transmission durations for a corresponding radio bearer among the plurality of radio bearers that are configured for the UE.

3. The method of claim 1, wherein generating the PDU comprises:
generating the PDU to not include data of any radio bearer that does not satisfy the condition.

4. The method of claim 1, wherein transmitting the PDU comprises:
transmitting the PDU based on the first transmission duration.

5. A device comprising:
at least one processor; and
at least one computer memory that is operably connectable to the at least one processor and that stores thereon at least one code which, when executed, causes the at least one processor to perform operations comprising:
receiving a plurality of transmission duration configurations, wherein each transmission duration configuration relates to a maximum allowed transmission duration on a corresponding radio bearer among a plurality of radio bearers that are configured for a user equipment (UE);
receiving an uplink grant to perform an uplink transmission with a first transmission duration;
generating a protocol data unit (PDU) to include data for at least one radio bearer among the plurality of radio bearers; and
transmitting the PDU based on the uplink grant,
wherein the data that is included in the PDU is determined based on at least a condition that:
for each radio bearer among the at least one radio bearer for which data is included in the PDU, the first transmission duration satisfies a comparison criterion with the maximum allowed transmission duration for the each radio bearer.

6. The device of claim 5, wherein the plurality of transmission duration configurations includes at least one transmission duration configuration that provides a plurality of allowed transmission durations for a corresponding radio bearer among the plurality of radio bearers that are configured for the UE.

7. The device of claim 5, wherein generating the PDU comprises:
generating the PDU to not include data of any radio bearer that does not satisfy the condition.

8. The device of claim 5, wherein transmitting the PDU comprises:
transmitting the PDU based on the first transmission duration.

9. A computer readable storage medium that stores thereon at least one code which, when executed by the at least one processor, causes at least one processor to perform operations comprising:
receiving a plurality of transmission duration configurations, wherein each transmission duration configuration relates to a maximum allowed transmission duration on a corresponding radio bearer among a plurality of radio bearers that are configured for a user equipment (UE);
receiving an uplink grant to perform an uplink transmission with a first transmission duration;
generating a protocol data unit (PDU) to include data for at least one radio bearer among the plurality of radio bearers; and
transmitting the PDU based on the uplink grant,
wherein the data that is included in the PDU is determined based on at least a condition that:
for each radio bearer among the at least one radio bearer for which data is included in the PDU, the first transmission duration satisfies a comparison criterion with the maximum allowed transmission duration for the each radio bearer.

10. The computer readable storage medium of claim 9, wherein the plurality of transmission duration configurations includes at least one transmission duration configuration that provides a plurality of allowed transmission durations for a corresponding radio bearer among the plurality of radio bearers that are configured for the UE.

11. The computer readable storage medium of claim 9, wherein generating the PDU comprises:
generating the PDU to not include data of any radio bearer that does not satisfy the condition.

12. The computer readable storage medium of claim 9, wherein transmitting the PDU comprises:
transmitting the PDU based on the first transmission duration.

13. A method for receiving, by a base station, a protocol data unit (PDU) in a wireless communication system, the method comprising:
transmitting a plurality of transmission duration configurations to a user equipment (UE), wherein each transmission duration configuration relates to a maximum allowed transmission duration on a corresponding radio bearer among a plurality of radio bearers that are configured for the UE;

transmitting, to the UE, an uplink grant for the UE to perform an uplink transmission with a first transmission duration; and receiving, from the UE, the PDU based on the uplink grant, wherein the PDU includes data for at least one radio bearer among the plurality of radio bearers that are configured for the UE, wherein the data that is included in the PDU satisfies a condition that:

for each radio bearer among the at least one radio bearer for which data is included in the PDU, the first transmission duration satisfies a comparison criterion with the maximum allowed transmission duration for the each radio bearer.

14. The method of claim 13, wherein the plurality of transmission duration configurations includes at least one transmission duration configuration that provides a plurality of allowed transmission durations for a corresponding radio bearer among the plurality of radio bearers that are configured for the UE.

15. The method of claim 13, wherein the PDU does not include data of any radio bearer that does not satisfy the condition.

16. The method of claim 13, wherein receiving the PDU comprises:

receiving the PDU based on the first transmission duration.

17. The method of claim 1, wherein the comparison criterion is satisfied by the first transmission duration being equal to the maximum allowed transmission duration for the each radio bearer.

18. The method of claim 1, wherein the comparison criterion is not satisfied by the first transmission duration being greater than the maximum allowed transmission duration for the each radio bearer.

* * * * *